(No Model.)

E. A. SMITH.
BUCKLE.

No. 376,267. Patented Jan. 10, 1888.

Witnesses,
J. H. Shumway,
Fred C. Earle

Earl A. Smith, Inventor
By atty,
Wm. C. Earle

UNITED STATES PATENT OFFICE.

EARL A. SMITH, OF WATERBURY, CONNECTICUT.

BUCKLE.

SPECIFICATION forming part of Letters Patent No. 376,267, dated January 10, 1888.

Application filed November 21, 1887. Serial No. 255,696. (No model.)

*To all whom it may concern:*

Be it known that I, EARL A. SMITH, of Waterbury, in the county of New Haven and State of Connecticut, have invented a new Improvement in Buckles; and I do hereby declare the following, when taken in connection with accompanying drawings and the letters of reference marked thereon, to be a full, clear, and exact description of the same, and which said drawings constitute part of this specification, and represent, in—

Figure 1:
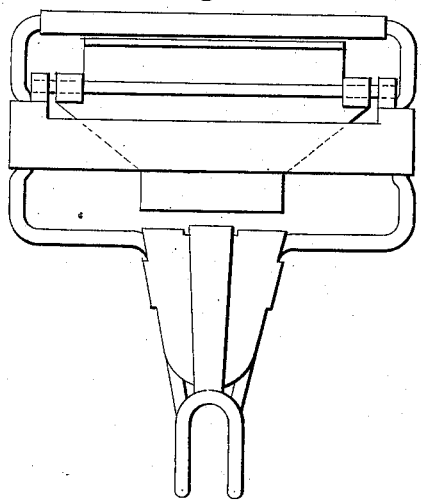
Figure 2:
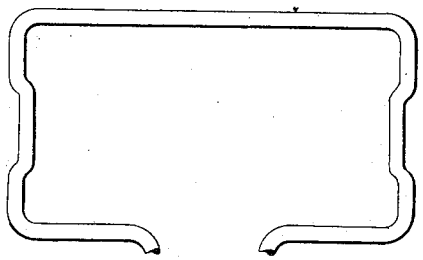
Figure 3:
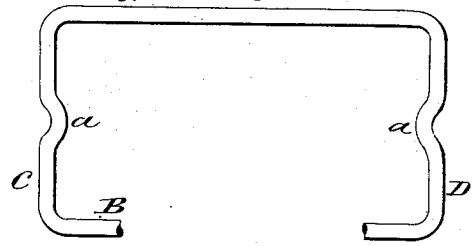
Figure 4:
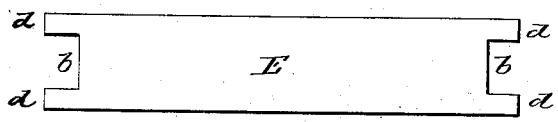
Figure 5:
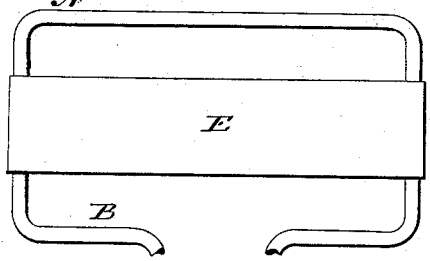
Figure 6:
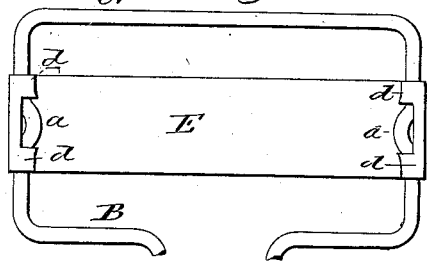

Figure 1, a buckle of the class to which this invention is applicable; Fig. 2, the frame of this buckle, showing the extended bends heretofore required to be made to receive the bar; Fig. 3, the frame as prepared under my invention to receive the bar; Fig. 4, the bar as prepared for attachment to the frame; Fig. 5, a front view of the frame with the bar attached; Fig. 6, a rear view of the frame with the bar attached.

This invention relates to an improvement in that class of buckles in which the frame is made from wire, and in which a sheet-metal bar extends across the frame parallel with the top and bottom and secured to the two ends—such, for illustration, as that shown in Fig. 1.

It is necessary to secure the bar to the ends of the frame, so as to prevent its sliding vertically thereon, and, as heretofore practiced, an inward bend has been made in the respective ends of the frame, as represented in Fig. 2, the length of the bend corresponding to the width of the bar, and so that the ends of the bar rest in the depression made in the ends of the frame, the ends of the bar closed around the bent portion of the ends of the frame, as indicated in Fig. 1.

In case the bar is a wire the inward bend in the ends of the frame serves a very good purpose; but in the case of a wider or flat sheet-metal bar the depressions in the ends of the frame to receive the bar necessarily appear to some extent both above and below the bar, and practically contract the width of the frame upon the respective edges of the bar to that extent.

The object of my invention is to close the ends of the bar around the ends of the frame and avoid this extended depression, and so as to give the ends of the frame the appearance of being straight or without bend. To this end the invention consists in making an inward bend in each end of the frame less in extent than the width of the bar, and constructing the frame with tongues upon its ends to embrace the ends of the frame above and below the bends in the said ends of the frame.

In illustrating the invention I omit the tongue or lever as well as the hook or attaching portions of the buckle, those parts not entering into the invention.

A represents the upper side of the frame, and B the lower side; C and D, the respective ends, the frame being formed of wire, in the usual manner. In the two ends of the frame, at the point where the bar is to be attached, inward bends $a$ are made in the wire, of less extent than the width of the bar to be applied.

E, Fig. 4, represents the blank from which the bar is to be formed. In extreme length it corresponds to the length of the frame from end to end, plus so much as will be required to close around the ends of the frame. In each end of the bar E a recess, $b$, is formed. The width of the recess corresponds to the extent or length of the bend $a$ in the frame. This recess leaves tongues $d$ projecting from the respective ends of the bar. The bar is placed upon the front of the frame, as represented in Fig. 5, the bar covering the respective bends $a$ $a$, and then the ends of the bar are turned backward around the ends of the frame, the tongues $d$ passing, respectively, above and below the bend $a$, as represented in Fig. 6, and so that the bar is interlocked with the frame both above and below the bend, and so that, the bend standing between the tongues, the said tongues take a bearing, respectively, above and below the bend, so as to firmly locate the bar on the frame. Under this construction the bend is entirely in rear of the bar, and the ends of the frame have the appearance of being straight from top to bottom, which gives to this class of buckles a neater appearance than when the bends are of an extent equal to the width of the frame and the ends of the frame closed around the bar within the bend. The illustration by which I show this means of attaching the bar to the frame will be sufficient to enable those skilled in the art to apply the invention to other buckle-frames made from wire, and to which a flat sheet-metal bar is required to be attached.

I claim—

A buckle the frame of which is composed of wire, and in which a flat sheet-metal bar extends across the frame from end to end, the ends of the frame constructed with a bend, $a$, in each less in extent than the width of the bar, the ends of the said bar constructed with a recess corresponding in width to the length of the bend, and so as to form tongues $d$ on the respective ends of the bar, the said ends of the bar closed around the ends of the frame over the bends therein, the said tongues on the frame substantially above and below the bend, substantially as described.

EARL A. SMITH.

Witnesses:
H. L. SLAWSON,
JAMES STOVELL.